US008978974B2

(12) United States Patent
Voigt

(10) Patent No.: US 8,978,974 B2
(45) Date of Patent: Mar. 17, 2015

(54) SIGNATURE MANAGEMENT SYSTEM

(75) Inventor: Bruce Voigt, Big Bear City, CA (US)

(73) Assignee: B & K Leasing Company, Inc., Big Bear Lake, CA (US)

( * ) Notice: Subject to any disclaimer, the term of this patent is extended or adjusted under 35 U.S.C. 154(b) by 1183 days.

(21) Appl. No.: 11/621,500

(22) Filed: Jan. 9, 2007

(65) Prior Publication Data

US 2008/0073427 A1 Mar. 27, 2008

Related U.S. Application Data

(60) Provisional application No. 60/826,949, filed on Sep. 26, 2006.

(51) Int. Cl.
*G06K 5/00* (2006.01)
*G06K 9/00* (2006.01)

(52) U.S. Cl.
CPC ........ *G06K 9/00154* (2013.01); *G06K 9/00979* (2013.01)
USPC ............................................ 235/380; 705/44

(58) Field of Classification Search
USPC ............ 235/380; 382/115, 119; 715/268, 41; 705/67, 21, 44
See application file for complete search history.

(56) References Cited

U.S. PATENT DOCUMENTS

| | | | | |
|---|---|---|---|---|
| 5,544,255 | A * | 8/1996 | Smithies et al. | 382/119 |
| 6,064,751 | A | 5/2000 | Smithies et al. | |
| 6,091,835 | A | 7/2000 | Smithies et al. | |
| 6,149,440 | A | 11/2000 | Clark et al. | |
| 6,307,955 | B1 | 10/2001 | Zank et al. | |
| 6,598,799 | B1 | 7/2003 | Jang | |
| 7,093,197 | B2 | 8/2006 | Yoshii et al. | |
| 7,340,413 | B2 * | 3/2008 | Kasasaku | 705/21 |
| 2003/0004812 | A1 * | 1/2003 | Kasasaku | 705/21 |
| 2004/0093568 | A1 * | 5/2004 | Lerner et al. | 715/541 |
| 2004/0165791 | A1 * | 8/2004 | Kaltanji | 382/305 |
| 2005/0033704 | A1 * | 2/2005 | Kirk | 705/67 |

* cited by examiner

*Primary Examiner* — Sonji Johnson
(74) *Attorney, Agent, or Firm* — SoCal IP Law Group LLP; John E. Gunther; Steven C. Sereboff

(57) ABSTRACT

There is disclosed a method for customer signature management. A customer's signature may be captured by means of a signature capture panel. The capture signature may be stored in one or more data files with a date and time tag.

26 Claims, 5 Drawing Sheets

SIGNATURE MANAGEMENT SYSTEM

RELATED APPLICATION INFORMATION

This patent claims benefit of the filing date of U.S. Provisional Patent Application Ser. No. 60/826,949, filed Sep. 26, 2006, the content of which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to electronic capture of customer signatures.

2. Description of the Related Art

Systems that capture customer signatures in digital form are widely used in business in a variety of applications, including recording credit/debit card transactions and documenting package delivery. There are other applications where a business may want to retain a copy of a customer's signature.

Customers participating in a recreational or other activity that has some level of risk may be required to sign a consent and liability waiver form. Examples of activities that may require such a liability waiver include skiing, scuba diving, sky diving, parasailing, and others. Other types of businesses, including medical practices, also have customers sign consent and waiver forms. There may be other situations where businesses need to retain a customer signature along with a date and time stamp.

DETAILED DESCRIPTION

Throughout this description, the embodiments and examples shown should be considered as exemplars, rather than limitations on the apparatus and methods disclosed or claimed.

Throughout this description, the term "customer" will be used to denote any person whose signature is being captured, or converted to a digital form. The customer may be a customer, a client, a visitor, a guest, a patient or any other person where a record of the person's signature is desired. The term customer does not require a commercial transaction.

The term "signature" has the usual meaning of a person's name, hand-written in script by the person. The signature may be comprised of a family name or surname, and one or more given names. Each of these names, in turn, may be comprised of a plurality of alphabet letters written in specific sequence. Each name begins with a first or initial letter, commonly referred to as an "initial". In the United States, a person commonly may have a first given name, a middle given name, and a last name that is the family name or surname. A common signature format is the first name, middle initial (first letter of the middle name), and last name. Another common signature format is the first initial (first letter of the first name) and middle initial followed by the last name. Many variations on the signature format are possible, and other cultures and geographic regions may have different name and signature formats.

In this description, the term "alphabetical letter" means a written letter, generally within a signature. The term "alphabetical character" means a digital representation of a alphabetical letter. The terms "sign" and "signing" mean the act of writing a signature. The term "customer signature management" refers to the overall process of capturing, storing, archiving, and retrieving customer signatures or any part thereof.

Description of Apparatus

Figure 1:
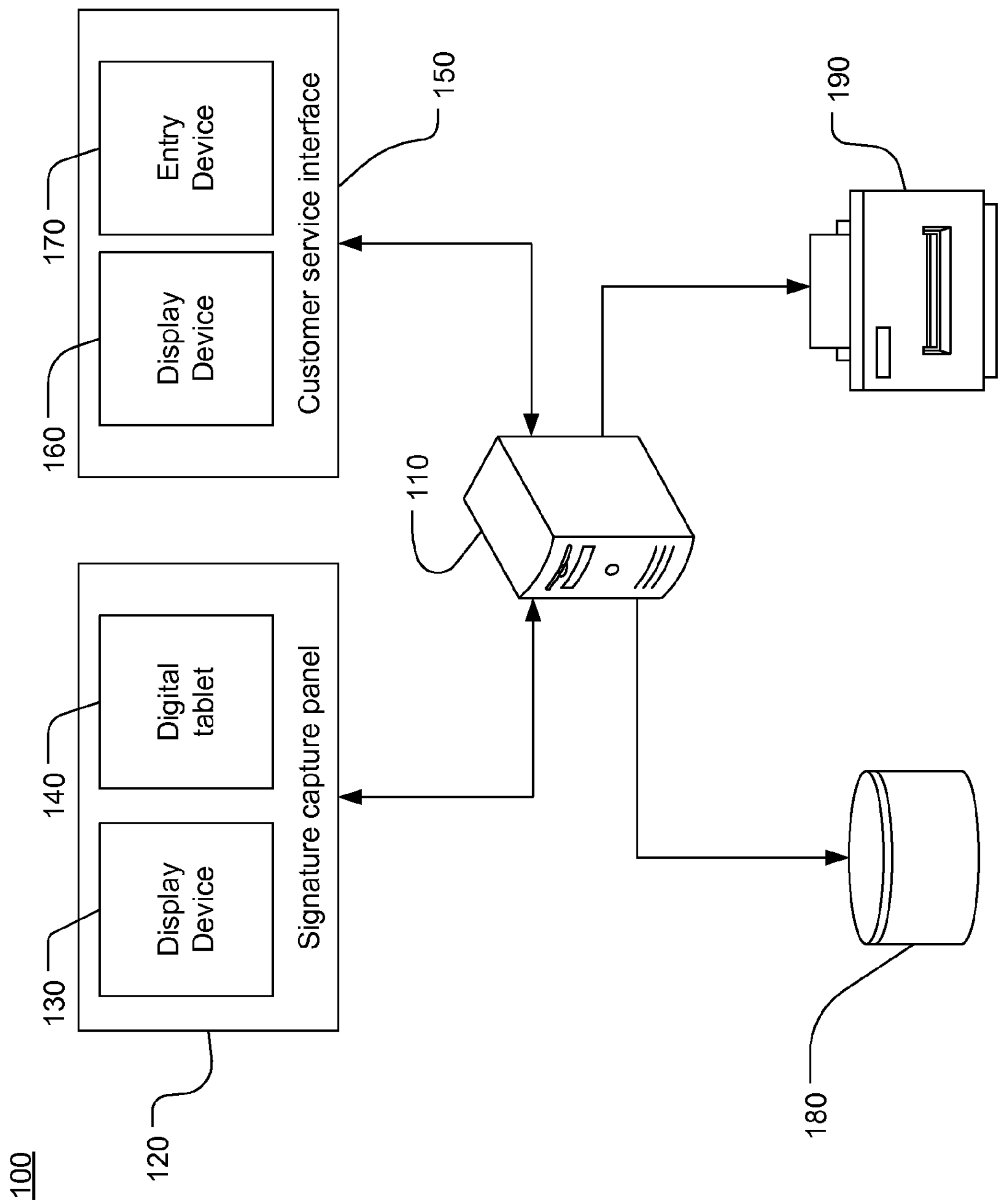
FIG. 1 is a block diagram of a customer signature management system.

Referring now to FIG. 1, a customer signature management system 100 includes a computing device 110, at least one storage device 180, signature capture panel 120, customer service interface 150, and optional printer 190. The signature capture panel 120 may include a digital tablet 140 and a display device 130, which may be integrated into a single device. The customer service interface 150 may include a second display device 160 and a data entry device 170.

Although the computing device 110 is shown as implemented in a personal computer, the processes and apparatus may be implemented with any computing device. A computing device as used herein refers to any device with a processor, memory and a storage device that may execute instructions including, but not limited to, personal computers, server computers, computing tablets, portable computers, and laptop computers. These computing devices may run any operating system, including, for example, variations of the Linux, Unix, MS-DOS, Microsoft Windows, Palm OS, and Apple Mac OS X operating systems.

The hardware and firmware components of the computing device 110, the signature capture panel 120, and the customer service interface 150 may include various specialized units, circuits, software and interfaces for providing the functionality and features described herein. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by the computing device and others by other devices.

The storage device 180 may be any storage device containing a storage medium included within or otherwise coupled or attached to the computing device 110. These storage media include, for example, magnetic media such as hard disks, floppy disks and tape; optical media such as compact disks (CD-ROM and CD-RW) and digital versatile disks (DVD and DVD±RW); flash memory cards; and any other storage media. As used herein, a storage device is a device that allows for reading and/or writing to a storage medium. Storage devices include hard disk drives, DVD drives, flash memory devices, and others. Storage device 180 may be physically included within computing device 110.

The computing device 110 may contain or be connected to more than one storage device 180. The computing device 110 may contain or be connected to a first storage device, such as a hard disc drive, with non-removable storage media and to a second storage device, such as a read/write compact disc drive, with removable storage media. The removable storage media may be used for archival storage.

The digital tablet 140 within the signature capture panel 120 may be any device that allows data entry by means of a surface on which a signature may be written using a stylus, pen, or other object. The digital tablet 140 may be a pressure-sensitive surface, or may use other electrical, magnetic, or optical means to convert the motions of a pen or stylus into digital form. The digital tablet 140 may be integrated with the display device 130. The signature capture panel 120 may be adapted specifically for signature capture, such as signature capture devices made by Topaz Systems and Interlink Electronics. The signature capture panel 120 may be any device that allows data entry by means of a pressure-sensitive surface or other means, including a PDA or tablet personal computer.

The customer service interface 150 may be integral to the computing device 110 or may be separate hardware linked to the computing device 110 by means of a network or other interface. The data entry device 170 may be a keyboard or key pad; a mouse, trackball, or other pointing device; or a touch-sensitive panel overlaying and integral to the display device 160.

The customer signature management system 100 may be dedicated to the customer signature capture function or be adapted to perform other functions. The other functions may include recording sales, validating credit card transactions, and printing receipts or tickets. In the event that the customer signature management system 100 is used for multiple functions that require customer signatures, separate signatures may be required for each function. For example, a customer may be required to provide a first signature to acknowledge a disclaimer and liability waiver, and to provide a second signature to conduct a credit card transaction.

In applications with sufficient customer volume, the computing device 110 may connect to additional signature capture panels and customer service interfaces not shown in FIG. 1. The additional interfaces may be similar or identical to the signature capture panel 120 and customer service interface 150. Alternately, multiple customer signature management systems may be connected into a network as shown in FIG. 2.

Figure 2:
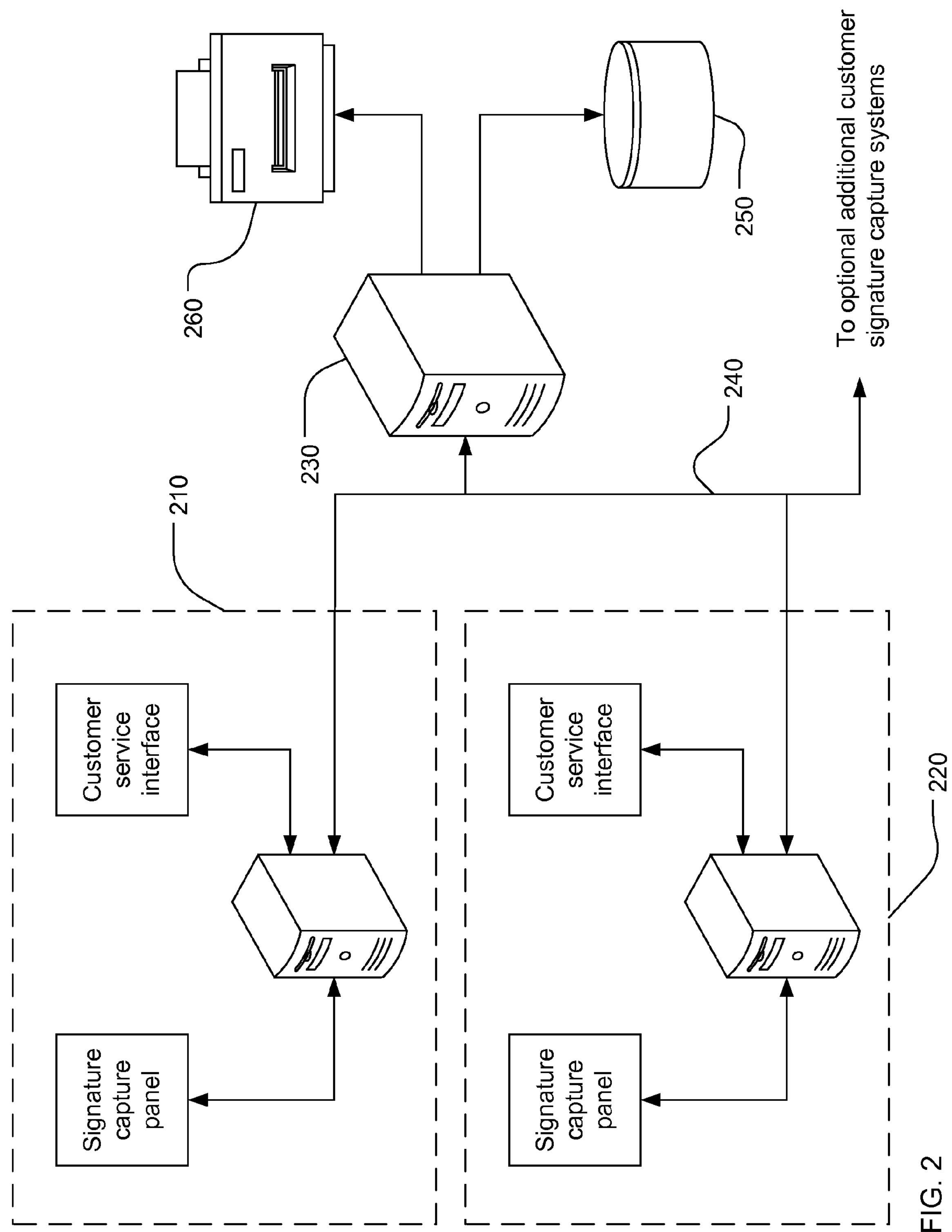
FIG. 2 is a block diagram of a customer signature management system.

FIG. 2 is a block diagram of a customer signature management system composed of a first customer signature management system 210, a second customer signature management system 220, and a server 230 connected by a network 240. The first and second customer signature management systems 210, 220 may be similar to the customer signature management system 100 of FIG. 1. One or both of first and second customer signature management systems 210, 220 may include a storage device or a printer not shown in FIG. 2. Although only first and second customer signature management systems 210, 200 are shown in FIG. 2, it should be understood that the overall system may optionally include additional signature management systems.

The server 230 may be a computing device, as previously described, connected to the network 240. The computational demands on the server may not be high and the server may be a computing device similar to those used within the customer signature management systems 210, 220. The server may connect to one or more storage devices 250, as previously described, and may connect to a printer 260.

The network 240 may be a local area network (LAN), a wide area network (WAN), the Internet, or a combination of these. The network 240 may be wired, wireless, or a combination of wired and wireless. The network 240 may be public or private, may be data unit switched or circuit switched, and may be a combination of these. The network 240 may be comprised of a single node or multiple nodes providing numerous physical and logical paths for data to travel. The network 240 may also consist of a point-to-point connection between each customer signature management system 210, 220 and the server 230.

The customer signature management system 100, 210, 220 and the server 230 may be configured to provide high availability and reliability. The customer signature management system 100, 210, 220 and the server 230 may be powered by an uninterruptible power source, and may be configured with redundant components such as processors, power supplies or storage devices.

Description of Processes

Figure 3:
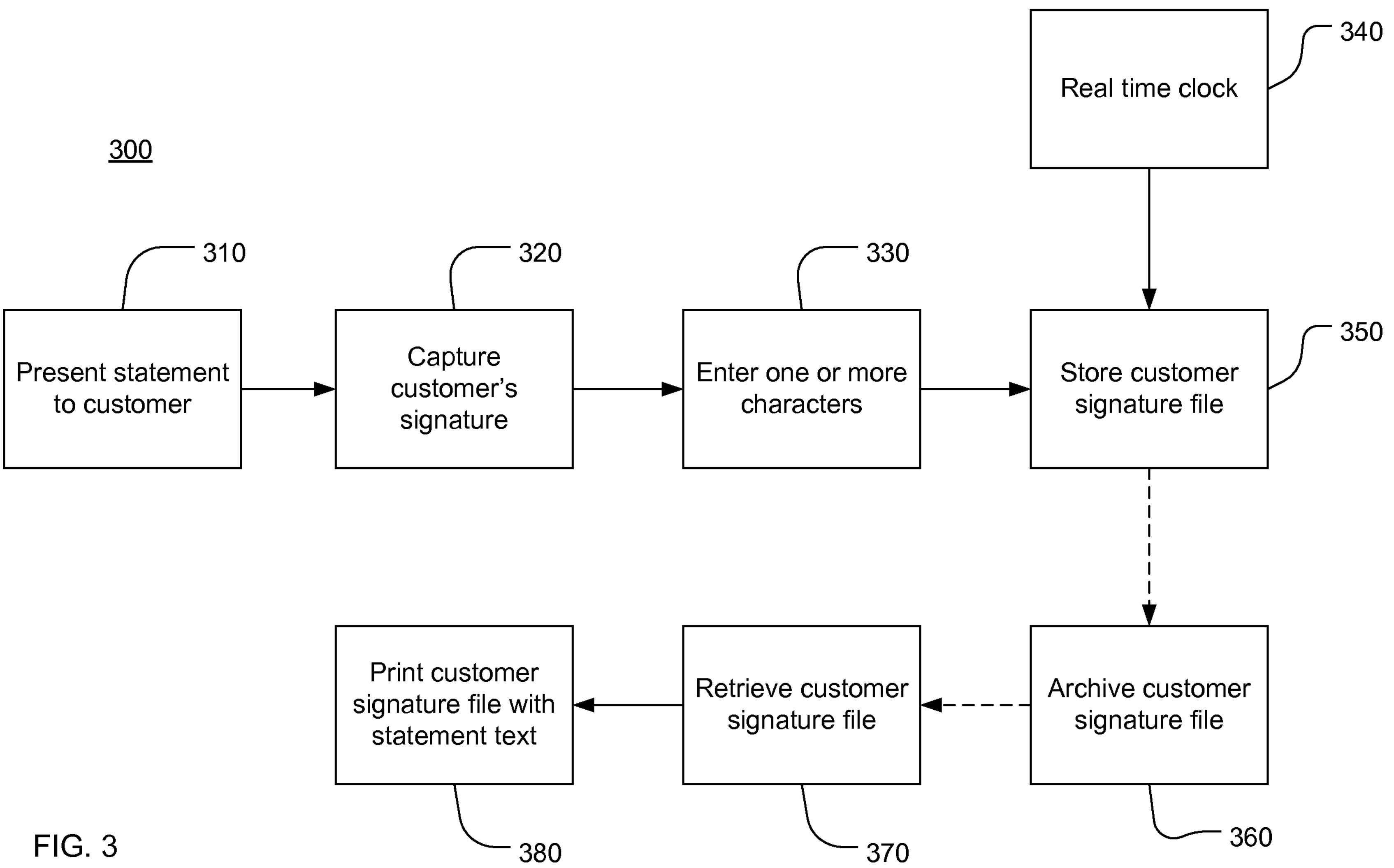
FIG. 3 is a flow chart of a process for signature management.

FIG. 3 is a flow chart for a process 300 for managing customer signatures. The process 300 is consistent with signature management systems 100, 210, 220 of FIG. 1 and FIG. 2, but may be compatible with other systems.

Starting at 310, a statement may be presented to the customer. The statement may be a disclaimer and liability waiver or other document. The statement may be may be given to the customer on paper. The statement may be presented to the customer visually as fixed printed signage or as a format on a display device. The statement may be presented to the customer audibly by means of a recording played through an audio system, or by a customer service e representative reading the statement. The statement may be presented to the customer electronically by means, for example, of a text message to the customer's cell phone. More than one method may be used to present the statement to the customer.

At 320, the customer's signature, acknowledging the receipt or presentation of the statement, may be captured in digital form using a signature capture device. In some situations, the customer's signature may acknowledge receipt of the statement on behalf of themselves and others, such as minor children. The customer's signature may be presented back to the customer by a display device that may be integral to the signature capture device. The customer may be required to take some action, such a pressing a key, to accept their signature. Additional signage and/or a verbal request from a customer service representative may be used to instruct the customer to sign, and to ensure that the customer is informed that their signature acknowledges the statement. Optionally, the customer may be asked to print their name in block letters on the signature capture device in addition to signing.

A customer service representative may review a displayed image of the captured signature. The customer service representative may be a ticket agent, sales person, receptionist, or other person interacting with the customer. The customer service representative may review the displayed image of the signature for legibility and for consistency between the signature and the printed customer name if requested. In some situations, the customer service representative may compare the captured signature to an existing signature on another document such as the customer's driver's license. The comparison between the captured signature and the existing signature could also be done by scanning the existing signature into a computing device and then using data processing techniques to compare the signatures.

At 330, the customer service representative may accept the captured signature by entering one or more characters using a suitable data entry device such as a mouse or keyboard. Once accepted, the captured signature may be combined with a date and time tag from real time clock 340. Real time clock information is commonly available within computing devices. At 350, one or more data files containing the captured, or digitized, customer signature (and the printed name if requested) are stored with a date and time tag. The process of storing the files may be initiated automatically by the entry of the one or more characters at 330. The stored files may include a graphic file containing an image of the signature and may include a signature file containing a non-graphical description of the signature. The signature file may capture the signature as a sequence of pen motions including pen speed and pressure. The graphic file may be in any image file format including Windows Bitmap (.bmp), Tagged Image File (.tif), JPEG (jpg) or other known or custom image file format. The captured customer signature may also be bound to an electronic copy of the disclaimer and liability waiver statement and stored in a format consistent with the requirements of the Uniform Electronic Transactions Act and/or the Electronic Signature in Global and National Commerce Act. Software to bind captured signatures to electronic documents is commercially available from several sources.

The one or more characters entered at 330 may be selected to facilitate later retrieval of one or more data file containing the captured customer signature. For example, the customer service agent may enter a character representing the first letter of the customer's last name; the first several letters of the customer's last name; the customer's first and last initials; the customer's first, middle, and last initials; or any other predefined combination of letters.

Figure 4:
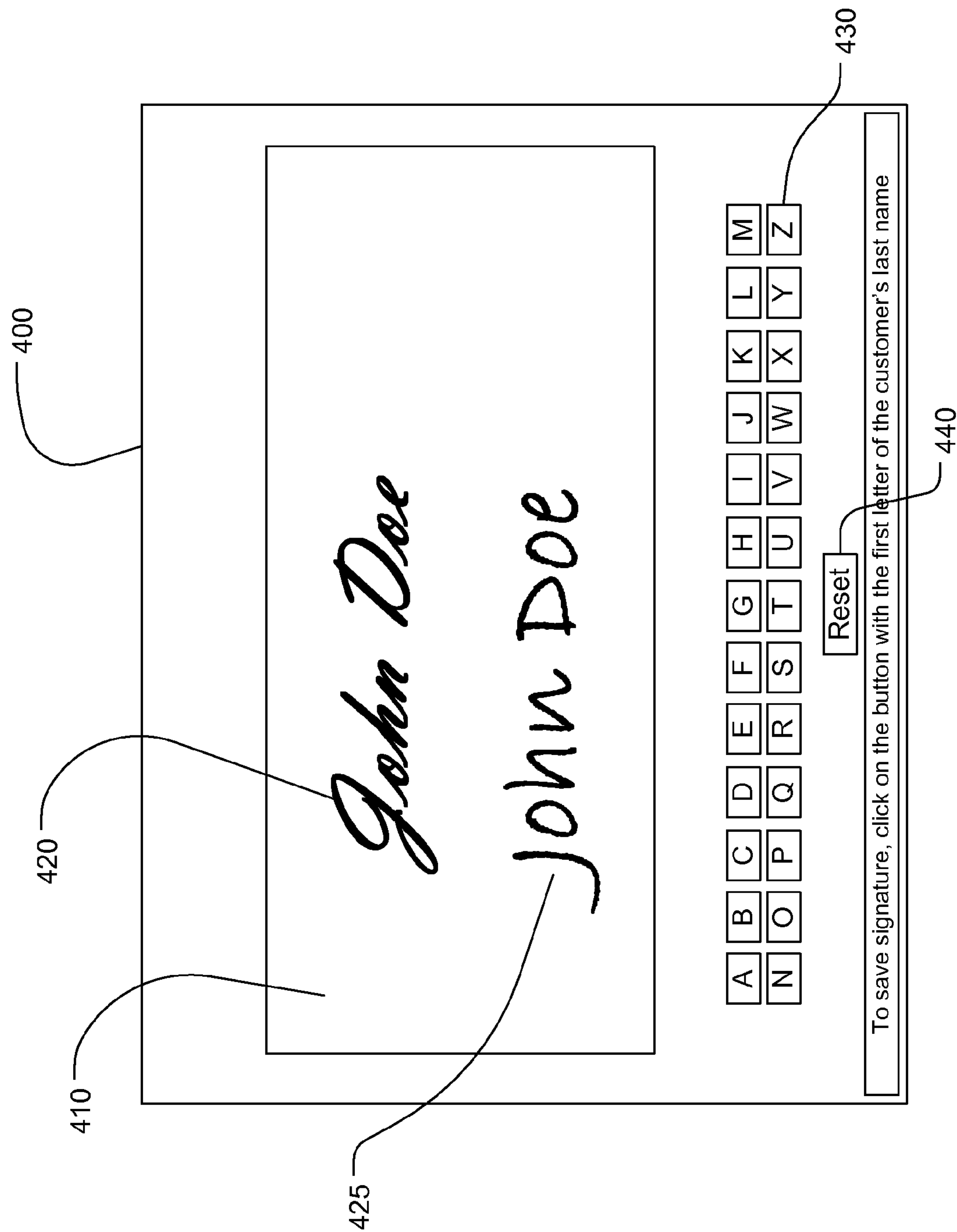
FIG. 4 is an exemplary display screen presentation at a customer service interface.

FIG. 4 shows an exemplary display screen 400 that may be presented to the customer service representative on a display device such as the display device 160 of FIG. 1. The display presentation may include an area 410 that provides an image of the information entered on a signature capture device. The entered information may include a rendering of the signature 420 entered by the customer and, if required, the printed name 425 entered by the customer. The display screen 400 may also include a set of alphabetical soft keys 430 and a reset or erase key 440 that can be selected, or "clicked" by a customer service representative using a mouse or other pointing device. Alternatively, a touch-sensitive data entry panel may be provided over the display screen such that the soft keys 430/440 may also be selected by touching the surface of the display. Alphabetical information may also be entered by means of a keyboard, in which case the display screen may not include the soft keys 430/440.

Returning to 350 in FIG. 3, the date and time tag may be attached to the captured signature file or files by incorporating the date and time into the file names. The file or files containing the captured signatures may be stored using a file name comprised of the one or more characters entered at 330 and the date and time provided by the real time clock. For example, clicking on the 'A' soft key may save the displayed signature to a file with a filename comprised of the letter 'A' followed by current date and time. The one or more characters and real time clock information can be combined to form the filename in any manner that allows future recovery of the files. In computers running a version of the Windows operating system, file names have the format "filename.extension", where the "extension" indicates the file type. Thus both image and non-image signature files may be stored using the same filename with different extensions. Other operating systems may have similar file naming conventions. The files may be stored in separate folders and/or directories for each file type.

The process from 310 to 350 may be repeated for each customer or group of customers as needed.

At periodic intervals, captured customer signature files may be copied to archival storage at 360. For example, the customer signature files on a customer signature management system such as 100 or a server such as 230 may be "burned" onto a compact disc storage medium. The compact disc medium may then be retained in a safe storage location for future use. Other types of archival storage media may be used including magnetic tape and removable magnetic discs. Redundant copies of the archival storage medium may be made. The time interval between archival storage events may be daily, weekly, or some other period as dictated by customer volume.

Figure 5:
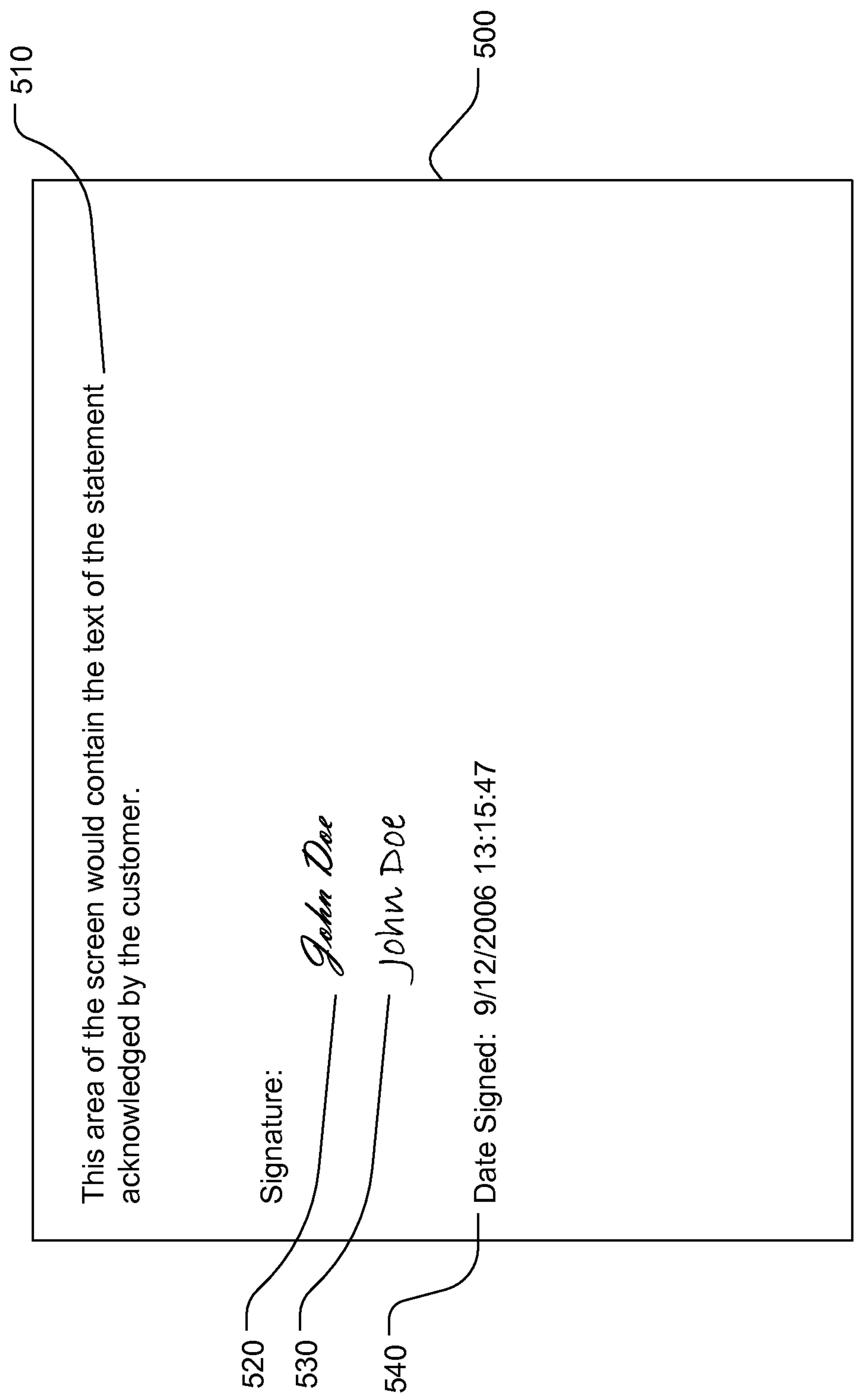
FIG. 5 is an exemplary display screen or document format.

When desired, a customer signature file or files may be retrieved from storage at 370 and displayed or printed at 380. FIG. 5 shows an exemplary display or print format including the text of the statement 510 that was acknowledged by the customer, a reproduction of the customer signature 520 and the printed name 530 if requested, and the date and time 540 that the signature was captured. The arrangement of elements 510-540 in FIG. 5 is arbitrary and an unlimited number of variations are possible.

While the preceding description was specific to the capture and management of customer signatures, the same methods and similar apparatus could be used to capture and manage other customer biometric data. For example, the signature capture panel could be replaced by or augmented by a fingerprint scanner, and the process could be used to capture and manage customer thumbprints.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for customer signature management comprising:

capturing a customer's signature by means of a signature capture panel, the customer's signature including a surname written as an ordered sequence of alphabetical letters beginning with a surname first letter receiving at least one alphabetical character entered by a customer service representative using a customer service interface in response to receiving the at least one alphabetical character, automatically storing the captured customer signature as a data file using a file name comprising the at least one alphabetical character and a time and date when the at least one alphabetical character was entered, the time and date provided by a real time clock.

2. The method for customer signature management of claim 1, wherein the file name consists of the at least one alphabetical character and the time and date.

3. The method for customer signature management of claim 2, wherein the at least one alphabetical character consists of the surname first letter.

4. The method for customer signature management of claim 2, wherein the name includes a given name beginning with a given name first letter the at least one alphabetical character consists of the given name first letter and the surname first letter.

5. The method for customer signature management of claim 2, wherein the name includes a given name beginning with a given name first letter and a middle initial the at least one alphabetical character consists of the given name first letter, the middle initial, and the surname first letter.

6. The method for customer signature management of claim 1, wherein the at least one alphabetical character is-consists of a portion of the letters comprising the name.

7. The method for customer signature management of claim 1, wherein the data file is saved as one of an image file and a non-image signature file.

8. The method for customer signature management of claim 1, wherein the customer service interface comprises a display device and a data entry device, the method further comprising presenting an image of the captured signature on the display device prior to receiving the at least one alphabetical character.

9. The method for customer signature management of claim 8, wherein receiving at least one alphabetical character entered by the customer service representative further comprises receiving at least one alphabetical character entered by the customer service representative using a customer service interface the data entry device after the customer service representative has viewed the image of the captured signature.

10. The method for customer signature management of claim 1, further comprising:

presenting a statement to the customer prior to capturing the customer's signature instructing the customer to acknowledge the statement by entering the customer's signature on the signature capture panel.

11. The method for customer signature management of claim 10, further comprising:

retrieving the stored data file printing the statement, the captured signature from the retrieved data file, and the date and time that the signature was captured as a single document.

12. The method for customer signature management of claim 10, wherein the data file is a data file in which the captured signature is locked to a digital copy of the statement.

13. A customer signature management system comprising:

a computing device including a processor, memory, and a real time clock a storage device a signature capture panel a customer service interface comprising a display device and an entry device the storage device having instructions stored thereon which when executed cause the computing device to perform actions comprising:

capturing a customer's signature entered on the signature capture panel, the customer's signature including a surname written as an ordered sequence of alphabetical letters beginning with a surname first letter receiving at least one alphabetical character entered by a customer service representative using the customer service interface in response to receiving the at least one alphabetic character, automatically storing the captured customer signature as a data file using a file name consisting of the at least one alphabetical character and a time and date when the at least one alphabetical character was entered, the time and date provided by the real time clock.

14. The customer signature management system of claim 13, wherein the at least one alphabetical character consists of the surname first letter.

15. The customer signature management system of claim 13, wherein the name includes a given name beginning with a given name first letter the at least one alphabetical character consists of the given name first letter and the surname first letter.

16. The customer signature management system of claim 13, wherein the name includes a given name beginning with a given name first letter and a middle initial the at least one alphabetical character consists of the given name first letter, the middle initial, and the surname first letter.

17. The customer signature management system of claim 13, wherein the data file is saved as one of an image file and a non-image signature file.

18. The customer signature management system of claim 13, the actions performed further comprising presenting an image of the captured signature on the display device prior to receiving the at least one alphabetical character.

19. The customer signature management system of claim 18, wherein receiving at least one alphabetical character entered by the customer service representative further comprises receiving at least one alphabetical character entered by the customer service representative using the customer service interface data entry device after the customer service representative has viewed the image of the captured signature.

20. A non-transient storage medium having instructions stored thereon which when executed by a computing device will cause the computing device to perform actions comprising:

capturing a customer's signature entered on a signature capture panel, the customer's signature including a surname written as an ordered sequence of alphabetical letters beginning with a surname first letter receiving at least one alphabetical character entered by a customer service representative using a customer service interface in response to receiving the at least one alphabetical character, automatically storing the captured customer signature as a data file using a file name consisting of the at least one alphabetical character and a time and date when the at least one alphabetical character was entered, the time and date from a real time clock.

21. The non-transient storage medium of claim 20, wherein the at least one alphabetical character consists of the surname first letter.

22. The non-transient storage medium of claim 20, wherein the name includes a given name beginning with a given name first letter the at least one alphabetical character consists of the given name first letter and the surname first letter.

23. The non-transient storage medium of claim 20, wherein the name includes a given name beginning with a given name first letter and a middle initial the at least one alphabetical character consists of the given name first letter, the middle initial, and the surname first letter.

24. The non-transient storage medium of claim 20, wherein the data file type is saved as one of an image file and a non-image signature file.

25. The non-transient storage medium of claim 20, wherein the customer service interface includes a display device and a data entry device, and the actions performed further comprising presenting an image of the captured signature on the display device prior to receiving the at least one alphabetical character.

26. The non-transient storage medium of claim 25, wherein receiving at least one alphabetical character entered by the customer service representative further comprises receiving at least one alphabetical character entered by the customer service representative using the data entry device after the customer service representative has viewed the image of the captured signature.

* * * * *